US009679315B2

(12) United States Patent
Carasso

(10) Patent No.: US 9,679,315 B2
(45) Date of Patent: **\*Jun. 13, 2017**

(54) SYSTEMS AND METHODS TO BYPASS ONLINE ADVERTISEMENT BLOCKERS

(71) Applicant: ADSUPPLY, INC., Culver City, CA (US)

(72) Inventor: Adam Carasso, Santa Monica, CA (US)

(73) Assignee: AdSupply, Inc., Culver City, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/149,096

(22) Filed: May 7, 2016

(65) Prior Publication Data

US 2016/0253718 A1 Sep. 1, 2016

Related U.S. Application Data

(63) Continuation-in-part of application No. 14/879,293, filed on Oct. 9, 2015, which is a continuation of
(Continued)

(51) Int. Cl.
*G06Q 30/02* (2012.01)
*H04L 29/08* (2006.01)
*G06F 17/30* (2006.01)
*H04L 29/06* (2006.01)
*H04L 29/12* (2006.01)

(52) U.S. Cl.
CPC ... *G06Q 30/0277* (2013.01); *G06F 17/30899* (2013.01); *G06Q 30/02* (2013.01); *H04L 63/029* (2013.01); *H04L 67/02* (2013.01); *H04L 67/20* (2013.01); *H04L 67/2804* (2013.01); *H04L 61/1511* (2013.01); *H04L 61/3025* (2013.01); *H04L 63/0245* (2013.01); *H04L 63/0428* (2013.01); *H04L 67/2814* (2013.01)

(58) Field of Classification Search
USPC ............................................. 705/14.4, 14.47
See application file for complete search history.

(56) References Cited

U.S. PATENT DOCUMENTS 7,058,633 B1 \* 6/2006 Gnagy .............. G06F 17/30887
9,177,335 B1 \* 11/2015 Carasso .................... G06F 9/00
(Continued)

*Primary Examiner* — Tsan-Yu J Huang
(74) *Attorney, Agent, or Firm* — Los Angeles Patent Group; Arman Katiraei

(57) ABSTRACT

Some embodiments provide an adblocking bypass system for ensuring that advertisements are loaded and presented on a user device running one or more adblockers. The adblocking bypass system is comprised of a bypass loader and a bypass proxy. The bypass loader is a component that is embedded within content publisher content. When the content publisher content is downloaded and parsed by a user device, the bypass loader executes by detecting the presence of any adblocker on the user device. If found, the bypass loader forwards any blocked advertisement calls to the bypass proxy. The bypass proxy retrieves the requested advertisements and returns them to the bypass loader which then reintroduces the advertisements in final content presentation or rendering. The bypass proxy may also modify the content publisher content by replacing any blocked advertisement calls embedded within the content with calls to the bypass proxy.

20 Claims, 9 Drawing Sheets

Related U.S. Application Data application No. 14/474,216, filed on Sep. 1, 2014, now Pat. No. 9,177,335.

(56) References Cited

U.S. PATENT DOCUMENTS

| | | |
|---|---|---|
| 2009/0287572 A1 | 11/2009 | Whelan |
| 2011/0131567 A1 | 6/2011 | Tirk et al. |
| 2013/0047074 A1* | 2/2013 | Vestergaard ............. G06F 3/14 715/234 |
| 2013/0311863 A1* | 11/2013 | Gutkin ............. G06F 17/30887 715/208 |
| 2014/0150019 A1* | 5/2014 | Ma ................... G06Q 30/0251 725/34 |
| 2016/0253718 A1* | 9/2016 | Carasso ............ G06Q 30/0277 705/14.73 |

* cited by examiner

SYSTEMS AND METHODS TO BYPASS ONLINE ADVERTISEMENT BLOCKERS

CLAIM OF BENEFIT TO RELATED APPLICATIONS

This application is a continuation-in-part of U.S. nonprovisional application Ser. No. 14/879,293 entitled "Systems and Methods to Bypass Online Advertisement Blockers", filed Oct. 9, 2015, which is a continuation of U.S. nonprovisional application Ser. No. 14/474,216 entitled "Systems and Methods to Bypass Online Advertisement Blockers", filed Sep. 1, 2014, now U.S. Pat. No. 9,177,335. The contents of application Ser. Nos. 14/879,293 and 14/474,216 are hereby incorporated by reference.

TECHNICAL FIELD

The present invention is directed to online advertisement systems and, more particularly, to systems and methods for counteracting online advertisement blockers that run on user devices.

BACKGROUND ART

Online advertising is an important revenue stream for many publishers of online content. Online advertising is also an important means through which different entities, products, and services generate goodwill, brand recognition, and customer loyalty as well as promote and disseminate information about those entities, products, and services.

Online advertisement can be in the form of banner, pop-up, embedded, in-line, interstitial, and full page canvas advertisements that are presented when a user visits a page, navigates away from a page, closes a page, or is otherwise directed to a page or an advertisement. The advertisements can be provided as links, audio content, or visual content including text, images, and other multimedia content.

Advertisement blocking tools, also referred to herein as adblockers, operate to block the display and, in some cases, the loading of online advertisements on websites, such as HyperText Markup Language (HTML) pages, and other downloadable content. Adblockers can be software applications, browser components, extensions, add-ons, scripts, or any service that operates in conjunction with a web browsing application, such as Chrome, Internet Explorer, and Firefox, for the purpose of blocking the display and/or loading of online advertisements.

Adblockers operate by intercepting calls to advertisements within content or preventing the advertisements from loading as part of the content. Typically, adblockers identify the advertisement calls that are to be intercepted using various blacklists. The blacklists may specify links or classes that identify various servers, services, or sources of advertisements. The blacklisted links include Uniform Resource Locators (URLs), other hyperlinks, or addressing to known advertisements or advertising providers. The blacklisted classes include function calls, scripting language, and other code that are used to embed advertisements within content. Adblockers may also block specific Cascade Style Sheet (CSS) selectors, CSS styles, and HTML elements from loading or being included as part of the content presentation. These and many other techniques may be used by different adblockers, but their objective is the same, to prevent the display or loading of advertisements that are embedded within online content.

Adblockers therefore prevent the presentation of content as originally intended by the originating content publisher. In so doing, adblockers deprive the content publisher of advertising revenue and also prevent the marketing, promotion, and information dissemination of entities, products, and services. Accordingly, there is a need to counteract the effect of adblockers and ensure that content is presented on the user device in the manner intended by the originating online content publisher.

SUMMARY OF THE INVENTION

It is an objective of the embodiments described herein to load and display advertisements as originally configured in online content publisher content, even when one or more adblockers execute on the user device. To achieve these and other objectives, some embodiments provide an adblocking bypass system.

The adblocking bypass system is comprised of a bypass loader and a bypass proxy. The bypass loader is a component that is embedded within content publisher content. The bypass loader is configured to run after the operation of any adblockers and reverse or counteract adblocker operation, thereby ensuring that advertisements configured as part of the content will be loaded and presented on the user device. In some embodiments, the bypass loader is configured to run after firing or execution of the load or onload event on the user device parsing and rendering the content.

When executed, the bypass loader detects presence of an adblocker running on the user device. In some embodiments, detection involves attempting to load an advertisement that is itself tracked or contains a trackable resource. If the tracked advertisement or resource is not present after the onload event, then the bypass loader determines that an adblocker is running on the user device.

If an adblocker is not detected on the user device, the bypass loader terminates and the user device processes, renders, and presents the content without modification. If the bypass loader detects presence of an adblocker, the bypass loader dynamically disguises the advertisement calls within the content to avoid having the calls match entries within the adblocker's blacklist. Specifically, the bypass loader uses a cipher to encrypt or otherwise obfuscate the domain name, hostname, Uniform Resource Locator (URL), or other address or request of the advertisement call. The bypass loader appends the cipher key used for the obfuscation to the obfuscated advertisement call. In some embodiments, the bypass loader also performs a base32 encoding of the obfuscated advertisement call to ensure it is formatted as a proper URL query. The bypass loader then passes the obfuscated advertisement call containing the encrypted original advertisement call and the cipher key used to perform the encryption to the bypass proxy. To ensure that the obfuscated advertisement call passing to the bypass proxy is not blocked by an adblocker, some embodiments periodically change the address (e.g., domain name) of the bypass proxy. The change can be performed automatically using a hash of a key or timestamp to generate the new address or domain name with a concerted action occurring at the bypass proxy to change routing or Domain Name System (DNS) configurations accordingly.

The bypass proxy is a hosted service that runs on a remote machine operating independent of the user device. The bypass proxy receives the obfuscated advertisement calls from the different bypass loader instances running on different user devices and reverses the obfuscation operations performed by the bypass loaders. For a specific obfuscated advertisement call, the bypass proxy decodes the base32 encoding, extracts the appended cipher key, and uses the cipher key to decrypt the original advertisement call. The bypass proxy then retrieves the advertisement from the corresponding advertisement server identified by the original advertisement call before forwarding the advertisement back to the appropriate bypass loader. To preserve the advertisers ability to track each user device with cookies or other means, the bypass proxy may include various header parameters including the user device IP address in the request to the advertisement server. Similarly, the header of the advertisement server response containing the requested advertisement may be parsed by the bypass loader to forward any tracking information or other relevant header parameters to the user device.

Upon receiving a forwarded advertisement from the bypass proxy, the bypass loader reintroduces the advertisement into the final presentation or rendering of the content. In some embodiments, the bypass loader reintroduces the advertisement by manipulating the Document Object Model (DOM) of the content rendering application running on the user device.

To avoid repeating these operations, in some embodiments, the bypass proxy modifies the content publisher content hosted on the remote site so that the original advertisement calls are replaced with the obfuscated advertisement calls. In other words, the bypass proxy rewrites the advertisement calls in the original content with addressing of the bypass proxy instead of addressing of the corresponding advertisement servers, wherein the addressing of the corresponding advertisement servers may be encrypted and/or included as part of the rewritten advertisement calls in some embodiments.

BRIEF DESCRIPTION OF THE DRAWINGS

In order to achieve a better understanding of the nature of the present invention, preferred embodiments for the adblocking bypass system will now be described, by way of example only, with reference to the accompanying drawings in which.

DETAILED DESCRIPTION

In the following detailed description, numerous details, examples, and embodiments for the adblocking bypass system are set forth and described. The adblocking bypass system is not limited to the embodiments set forth, and it may be practiced without some of the specific details and examples discussed. Also, reference is made to the accompanying figures, which illustrate specific embodiments in which the adblocking bypass system can be practiced. It is to be understood that other embodiments can be used and structural changes can be made without departing from the scope of the embodiments herein described.

Figure 1:
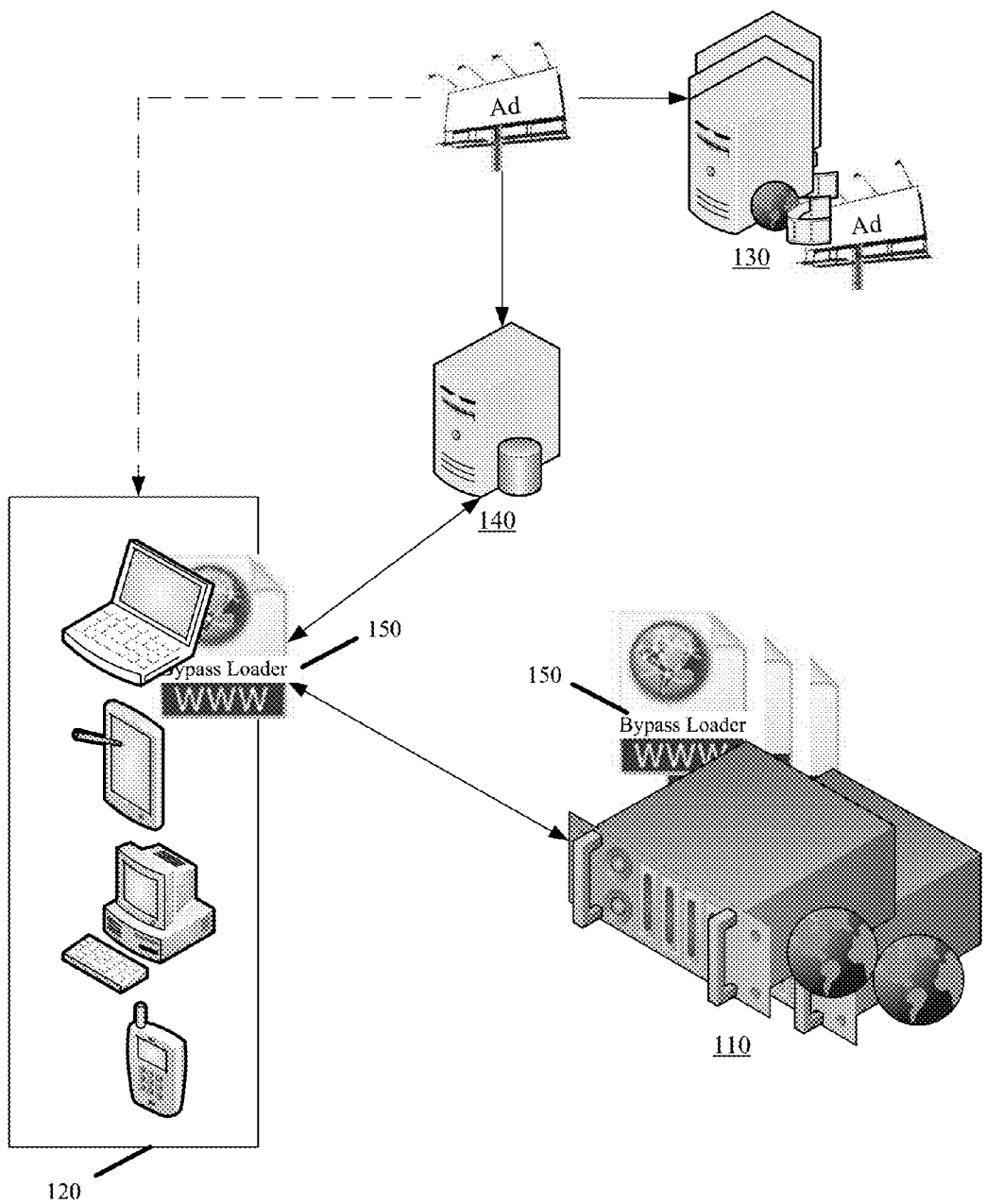
FIG. 1 illustrates the operating environment of the adblocking bypass system in accordance with some embodiments.

FIG. 1 illustrates the operating environment of the adblocking bypass system in accordance with some embodiments. Depicted as part of the operating environment are various content publishers 110, user devices 120, advertisement servers 130, and the adblocking bypass system comprised of the bypass proxy 140 and various bypass loaders 150.

Content publishers 110 originate content for consumption by the user devices 120. Content is a general term referring to any web site, text, document, file, media, application, service, or game that is digitally encoded and is deliverable across a network, such as the Internet. Content itself can be composed of content sub-components, wherein the sub-components may be provided by the same content publisher or other content publishers. For instance, content may be embedded with images provided by a first content publisher, a service provided by a second content publisher, and advertisements provided by one or more advertisement servers. In FIG. 1, the content publishers 110 are shown to operate one or more servers that host and deliver their content. However as is well known in the art, content publisher originated content can be hosted and served from other sources including content delivery networks (CDNs), cloud service providers, and caching or proxy servers operated by others independent of the content publishers 110.

Figure 9:
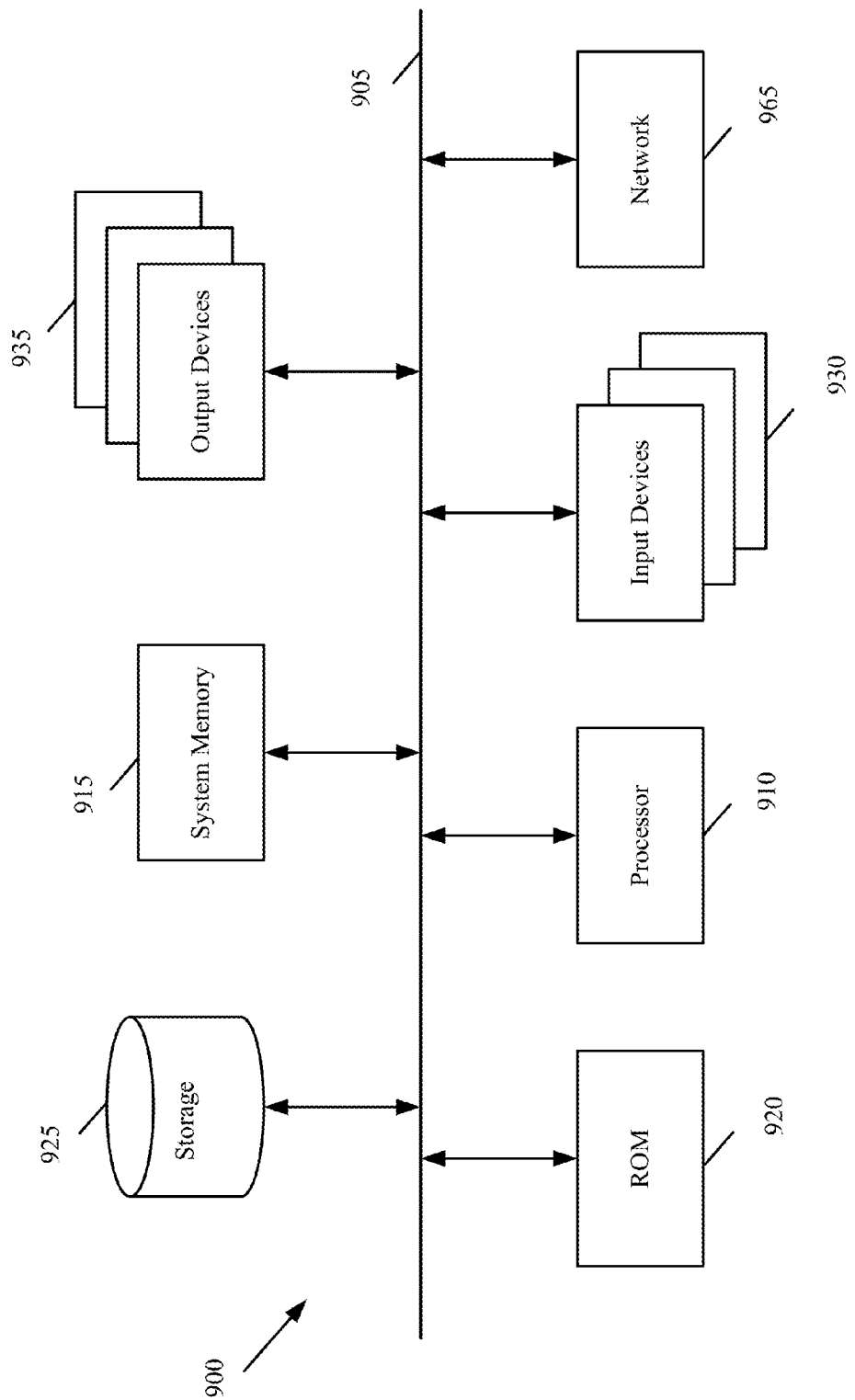
FIG. 9 illustrates a computer system or server with which some embodiments are implemented.

The user devices 120 include any device with a processor that runs a content processing, rendering, or presenting application. The user device can include any of a laptop computer, smartphone, tablet, and desktop computing machine as some examples. The most common application for processing, rendering, or presenting the content is a web browsing application (e.g., Internet Explorer, Firefox, Chrome, and Safari web browsers), although other applications running on the user device 120 can similarly process, render, or present the content publisher content. For the purposes of the discussion that it to follow, one or more adblockers are installed on the user devices 120 and running in conjunction with the content retrieval or content rendering application of the user devices 120. AdBlock and AdBlock Plus are examples of adblockers. As noted in the background section, the purpose of the adblockers is to block the display and/or loading of online advertisements that are embedded as part of the content being presented on a user device. FIG. 9 illustrates various components of the user devices 120, servers for the content publisher content, and the adblocking bypass system.

Advertisement servers 130 are machines that host and deliver various advertisements that are embedded within the content publisher content. As earlier noted, the content publisher content may be configured with zero or more advertisement calls. When a user device receives and processes content with one or more advertisement calls, the user device will parse and invoke those advertisement calls in order to identify and retrieve the advertisements from the appropriate advertisement servers 130. The advertisements are then rendered or displayed as part of the content in the manner configured or specified within the content publisher content.

The collective operations of the bypass proxy 140 and the bypass loaders 150 counteract adblocker functionality and ensure that advertisements embedded as part of the content publisher content will be loaded and displayed on the user devices 120, even when the user devices 120 run one or more adblockers. In some embodiments, the bypass loaders 150 are embedded in content publisher content as server-side scripts that dynamically adapt in response to adblocker operation. As adblockers modify which advertisement calls they block, the bypass loader modifies the manner in which the advertisements associated with those advertisement calls are retrieved in order to evade the adblocker from blocking those advertisements. In some embodiments, the bypass loaders 150 are embodied as JavaScript, although other scripting languages or code can be used to implement the bypass loaders 150. In some embodiments, a call or function embedded within the content publisher content can be used to invoke a bypass loader 150 on a machine that is remote to the user device issuing the call or function. In some embodiments, the bypass loader 150 is configured to execute when or after the "load" or "onLoad" Document Object Model (DOM) or HyperText Markup Language (HTML) event fires. These events fire when a page, object, or entirety of the content has finished loading on the corresponding user device. More importantly, the events fire after adblocker execution is complete.

Each bypass proxy 140 is a service that is hosted by the adblocking bypass system. The bypass proxy 140 is a network accessible machine that operates independent of the user devices 120 and content publishers 110, although in some embodiments, the bypass proxy 140 functionality described below can be incorporated directly with content publisher resources. Incorporating the bypass proxy 140 functionality directly within servers or other resources (e.g., load balancers) of the content publishers 110 is preferable for adblockers that prevent user devices from issuing calls to any third party when rendering first party content. In other words, when rendering content from a particular content publisher, an adblocker may block any calls issued to any domain deviating from that of the particular content publisher.

Figure 2:
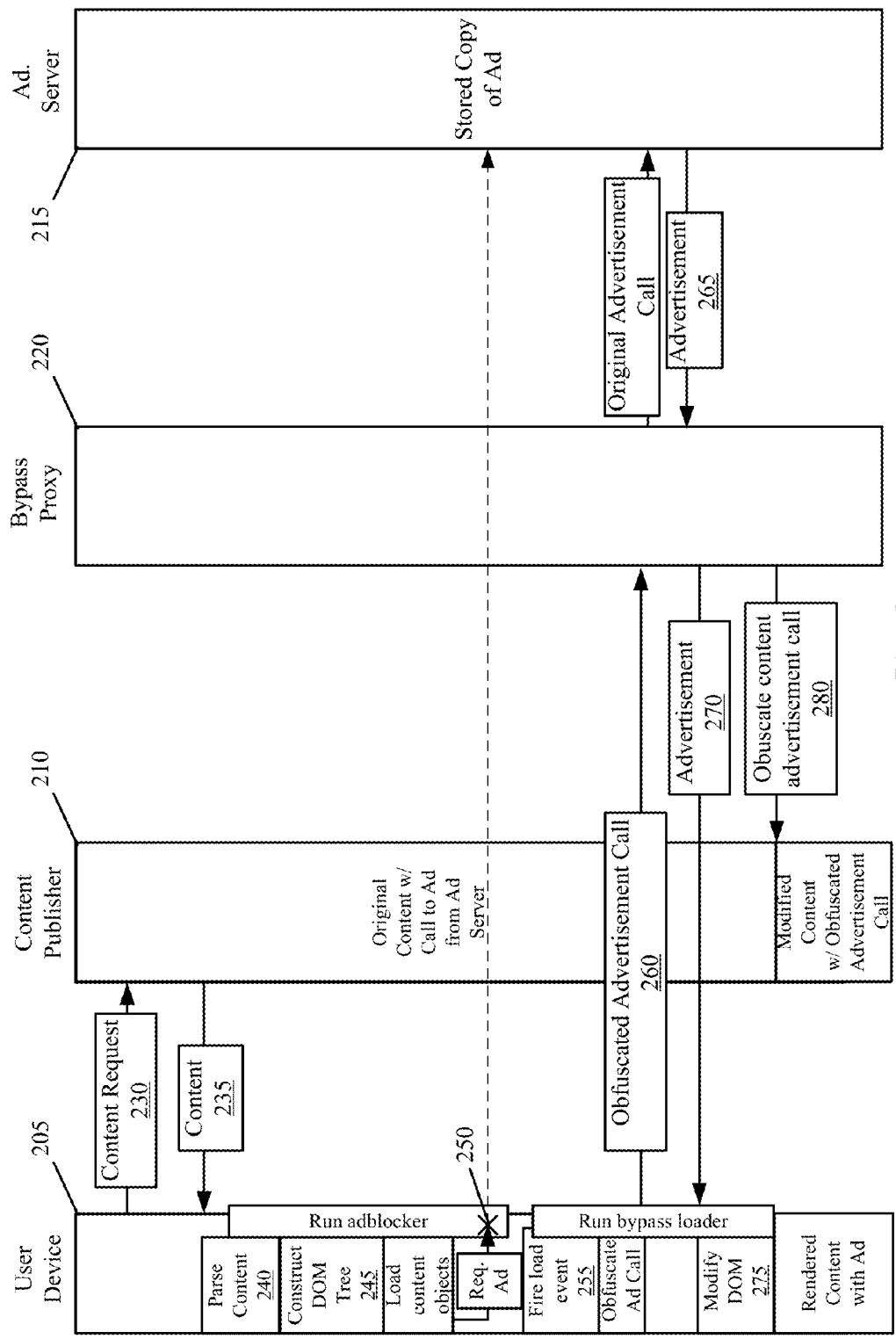
FIG. 2 presents a message exchange diagram illustrating operation of the adblocking bypass system in ensuring that advertisements are loaded and presented on a user device running one or more adblockers.

FIG. 2 presents a message exchange diagram illustrating operation of the adblocking bypass system in ensuring that advertisements are loaded and presented on a user device running one or more adblockers. In this figure, messages are exchanged between a user device 205, content publisher 210, advertisement server 215, and bypass proxy 220. The user device runs an adblocker in conjunction with a browsing application.

The message exchange commences when the user device 205 requests (at 230) content from the content publisher 210. The content publisher 210 content is embedded with the bypass loader of some embodiments. The content publisher 210 content is also embedded with at least one advertisement call that points to an advertisement that is hosted and served by the advertisement server 215. As an example, the advertisement call can be an "a href" HTML attribute with a link specifying an address of the advertisement server. The link can be a Uniform Resource Locator (URL) having a domain name or Internet Protocol (IP) address of the advertisement server, a directory path, and a filename of the advertisement. Different content publishers can use different advertisement call formatting, HTML elements, and scripts to issue the advertisement calls. In any event, once the advertisement call is issued, a URL or other address is used to request an advertisement from the appropriate advertisement server 130. In response to the user device 205 request, the content publisher 210 serves (at 235) the requested content with the at least one advertisement call and bypass loader to the user device 205.

The user device 205 or browsing application running on the user device begins by parsing (at 240) the content and constructing (at 245) the DOM hierarchy. Construction of the DOM hierarchy is well known in the art and an operation performed by most content browsing applications including web browsers. Generally, constructing the DOM hierarchy involves parsing the content into its various object components and producing a tree with nodes to represent the object components, style, and structure in a manner that is accessible through a standardized application programming interface (API).

While parsing the content and constructing the DOM hierarchy, the adblocker is invoked to intercept any advertisement calls that are embedded in the content and to prevent the advertisements requested by those calls from being loaded as part of the content. As shown, the adblocker intercepts and blocks (at 250) the advertisement call that attempts to retrieve an advertisement from the advertisement server 215. The adblocker may identify the advertisement call because the call specifies a URL, domain name, hostname, or other address that matches to an entry in the adblocker blacklist. The adblocker may also indirectly identify advertisement calls by blocking specific Cascade Style Sheet (CSS) selectors and HTML elements from being added to the DOM hierarchy. Specifically, the adblocker can intercept and prevent loading or display of advertisements by removing or hiding nodes from the DOM hierarchy that arise because of various advertisement calls. In such situations, the user device 205 may actually issue the advertisement calls with the adblocker later preventing them from being loaded or removing them once they are loaded as part of the content. Other adblockers may prevent the DOM hierarchy from being constructed with any advertisement related nodes. In such situations, the adblockers prevent the user device 205 from even issuing the advertisement calls to the corresponding advertisement server.

Once the content is parsed and the DOM hierarchy is constructed, the load event fires (at 255). The firing or completion of the load event triggers execution of the bypass loader that is also embedded as part of the content publisher content. The bypass loader detects for the presence of any adblocker running on the user device 205. The detection can be performed in any number of ways including attempting to load a specific advertisement tag that is itself tracked or contains a trackable resource. If an adblocker was running on the user device 205, the adblocker would remove or block that specific advertisement tag or trackable resource and the absence of which would indicate to the bypass loader that an adblocker is in fact running. The bypass loader then identifies the advertisement calls that were intercepted and blocked by the adblocker. In some embodiments, the bypass loader identifies the advertisement calls by scanning the content to look for addressing, links, or URLs to known advertisers or advertisement servers that are blacklisted by various adblockers. In some embodiments, the bypass loader identifies the advertisement calls by identifying calls within the content that do not have corresponding nodes in the DOM hierarchy as a result of the adblocker removing those nodes or preventing those nodes from being constructed. The bypass loader then obfuscates any identified advertisement calls and reissues the obfuscated advertisement calls to the bypass proxy 220. Obfuscating the advertisement calls is described with reference to FIG. 4 below. The bypass proxy 220 address is continually changed to ensure that the address is not within the adblockers' blacklists. As such, the obfuscated advertisement calls will not be blocked. However, some adblockers prevent calls to any third party domain including the domain specified in the bypass proxy 220 address. To overcome such restriction, some embodiments direct the obfuscated advertisement call to an address of a load balancer or other server operated by the first party content publisher 210. The load balancer or other server is configured to identify any obfuscated advertisement calls and either forward those calls to the bypass proxy 220 or perform the bypass proxy 220 operation by incorporating the bypass operation 220 functionality within the first party content publisher's own servers.

In FIG. 2, the bypass proxy 220 receives (at 260) an obfuscated advertisement call. In some embodiments, the obfuscated advertisement call includes the original advertisement call or the original link (e.g., URL) used in requesting the advertisement from the advertisement server 215. Accordingly, the bypass proxy 220 extracts the original advertisement call from the obfuscated advertisement call, requests the original advertisement from the advertisement server 215 as a result of issuing the original advertisement call, and retrieves (at 265) the original advertisement from the advertisement server 215. The bypass proxy 220 then forwards (at 270) the advertisement to the bypass loader running on the user device 205.

In some embodiments, the bypass proxy 220 may cache a copy of the advertisement such that future requests for that advertisement can be satisfied from cache without having to access the advertisement server 215. A time-to-live parameter may be provided to invalidate the cached copy of the advertisement and cause the bypass proxy 220 to retrieve another copy of the advertisement from the advertisement server 215 upon its expiration.

The bypass loader 205 reintroduces the advertisement that the adblocker removed back into the presentation or rendering of the content. In some embodiments, the bypass loader 205 reintroduces the advertisement by manipulating (at 275) the DOM hierarchy. In some embodiments, manipulating the DOM hierarchy involves inserting a node for the advertisement into the hierarchy with the attributes specified by the content provider for presenting the advertisement as part of the content rendering. The user device 205 resumes its normal operation and renders the content based on the modified DOM hierarchy. The resulting content rendering will include the advertisement that was originally intended by the content publisher 210 despite the operation of the adblocker running on the user device 205.

The bypass proxy 220 also accesses the copy of the content stored by the content publisher in order to modify (at 280) the advertisement call in the content. In some embodiments, the modification involves changing the source address or link of the advertisement call within the content to a modified address or link that is not within the adblocker blacklist. In some embodiments, the modification involves changing the advertisement call from requesting the advertisement from the advertisement server 215 to requesting the advertisement from the bypass proxy 220 with the original request to the advertisement server 215 being encrypted and included as part of the modified advertisement call. Different aliases or addresses for the bypass proxy 220 can be used to ensure that the adblockers do not prevent access of the user device 205 to the bypass proxy 220.

Figure 3:
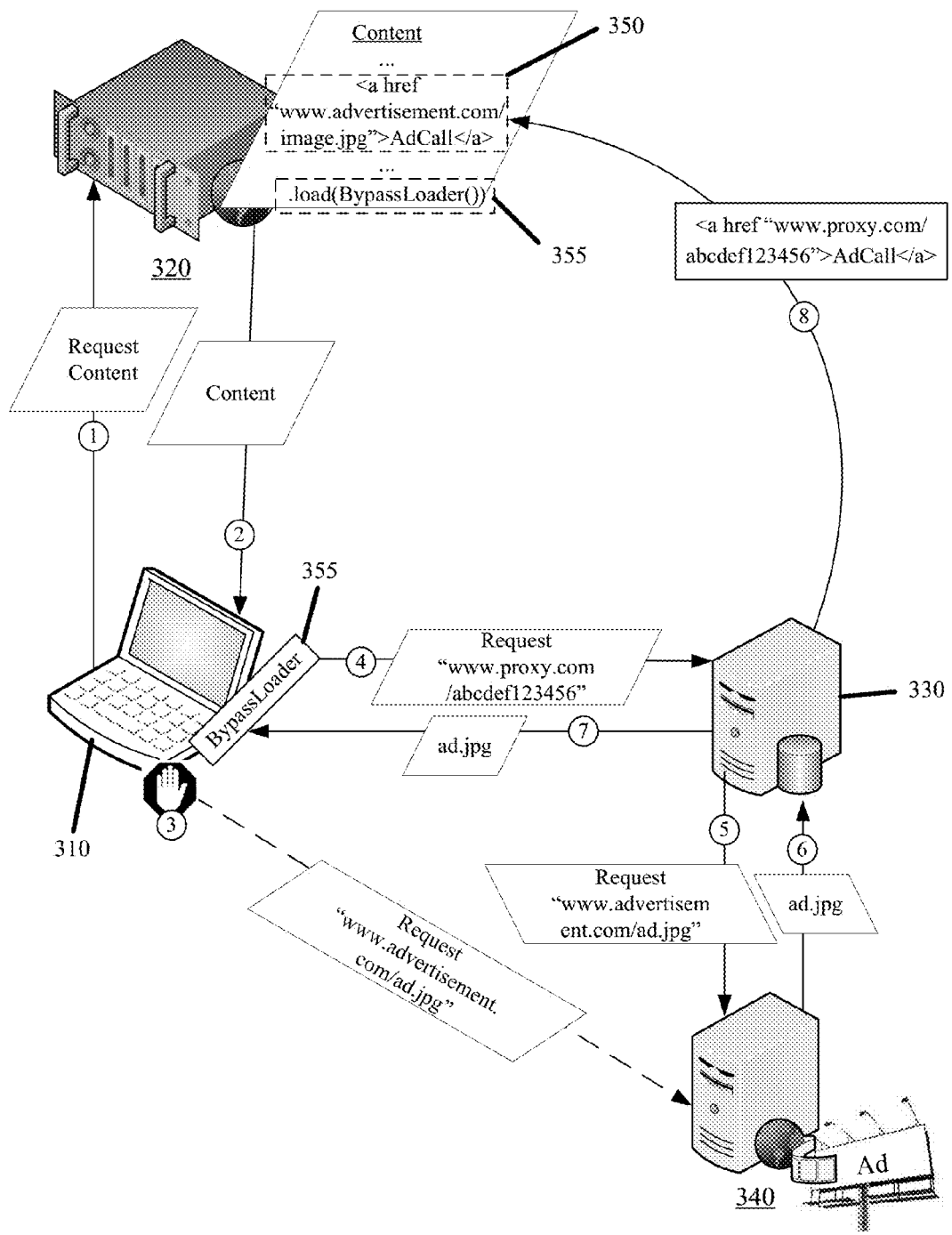
FIG. 3 conceptually illustrates operation of the adblocking bypass system in accordance with some embodiments.

FIG. 3 conceptually illustrates operation of the adblocking bypass system in accordance with some embodiments. Specifically, the figure illustrates operation between a user device 310, a remote site 320 hosting content publisher content, a bypass proxy 330, and an advertisement server 340.

The content publisher content includes at least an advertisement call 350 for including an advertisement as part of the content publisher content and a script for running the bypass loader 355 of some embodiments. In this figure, the advertisement call 350 is an HTML "a href" attribute specifying an advertisement URL for retrieving the advertisement from the advertisement server 340. The advertisement URL is "www.advertisement.com/ad.jpg". As before, the bypass loader 355 script is configured to execute after the load event on the user device 310 fires during the processing and rendering the content.

The user device 310 requests and receives the content publisher content from the remote site 320. The request can be issued by invoking a link, directing a browser of the user device 310 to the address of the site, or launching any application that loads the content publisher content. The content request is typically issued as a HyperText Transfer Protocol (HTTP) GET request with a URL identifying an address of the site 320 and the content being requested.

Upon receiving the content, an adblocker running on the user device 310 blocks the advertisement call 350. This may be due to the address (i.e., domain name) of the advertisement server 340 specified as part of the advertisement call being within the adblocker's blacklist.

After the user device 310 loads the content objects, the load event fires. Consequently, the bypass loader 355 script is invoked and the bypass loader 355 begins its operation. The bypass loader 355 detects the adblocker running on the user device 310 and the advertisement call that was blocked by the adblocker. The bypass loader 355 then obfuscates the advertisement call and issues the obfuscated advertisement call to the bypass proxy 330. As shown in FIG. 3, the obfuscated advertisement call is specified as "www.proxy.com/abcdef123456", wherein "proxy.com" is the domain name pointing to the bypass proxy 330 and the "abcdef123456" parameter obfuscates the original advertisement call to "www.advertisement.com/ad.jpg". The obfuscated advertisement call can be issued by the user device 310 because the bypass proxy 330 domain name is not within the adblocker blacklist and therefore will not be blocked. In some embodiments, included with the obfuscated advertisement call is a query string argument to inform the bypass proxy 330 that an adblocker was detected on the user device 310. An example of the query string argument is "adblock=true". In some embodiments, included with the obfuscated advertisement call is an HTTP header to forward the user device IP address to the bypass proxy 330.

When the bypass proxy 330 receives the obfuscated advertisement call, it decrypts the original advertisement URL from obfuscated advertisement call. Then using the original advertisement call, the bypass proxy 330 requests and retrieves the original advertisement from the advertisement server 340. The bypass proxy 330 returns the advertisement to the bypass loader 355 which then reintroduces the advertisement into the final rendering or presentation of the retrieved content as was intended by the content publisher.

The bypass proxy 330 may also modify the content hosted by site 320 so to avoid blocking of the embedded advertisement calls in the future. As shown, the bypass proxy 330 modifies the content by modifying the advertisement call to specify the proxy URL instead of the original advertisement URL.

To avoid the bypass proxy 330 address from being blacklisted and the obfuscated calls generated to the bypass proxy 330 from being blocked, the adblocking bypass system of some embodiments continually or dynamically changes the bypass proxy 330 address. In some embodiments, the address is automatically changed. In some such embodiments, the bypass loader includes an address generation engine that generates an address of bypass proxy 330 based on a hash of a shared key, a date, or timestamp. The resulting hash can be a temporary domain name that points to the bypass proxy 330. For example, a new domain name resolving to the bypass proxy 330 can be generated daily. The same address generation engine is run for the bypass proxy 330 to dynamically configure any routers or authoritative Domain Name System (DNS) servers that resolve the temporary domain names to the bypass proxy 330. This can include changing an A record, canonical name (CNAME), or alias of the routers or DNS servers used to resolve the temporary domain names to the bypass proxy 330 IP address. As noted above, an alternative is generate obfuscated calls that address the first party content publisher from which the content is received, with the first party publisher redirecting the obfuscated call to the bypass proxy 330. Specifically, local URLs are configured at the first party content publisher to redirect to the bypass proxy 330 and the bypass loader 355 generates obfuscated calls addressed to one of the local URLs.

Figure 4:
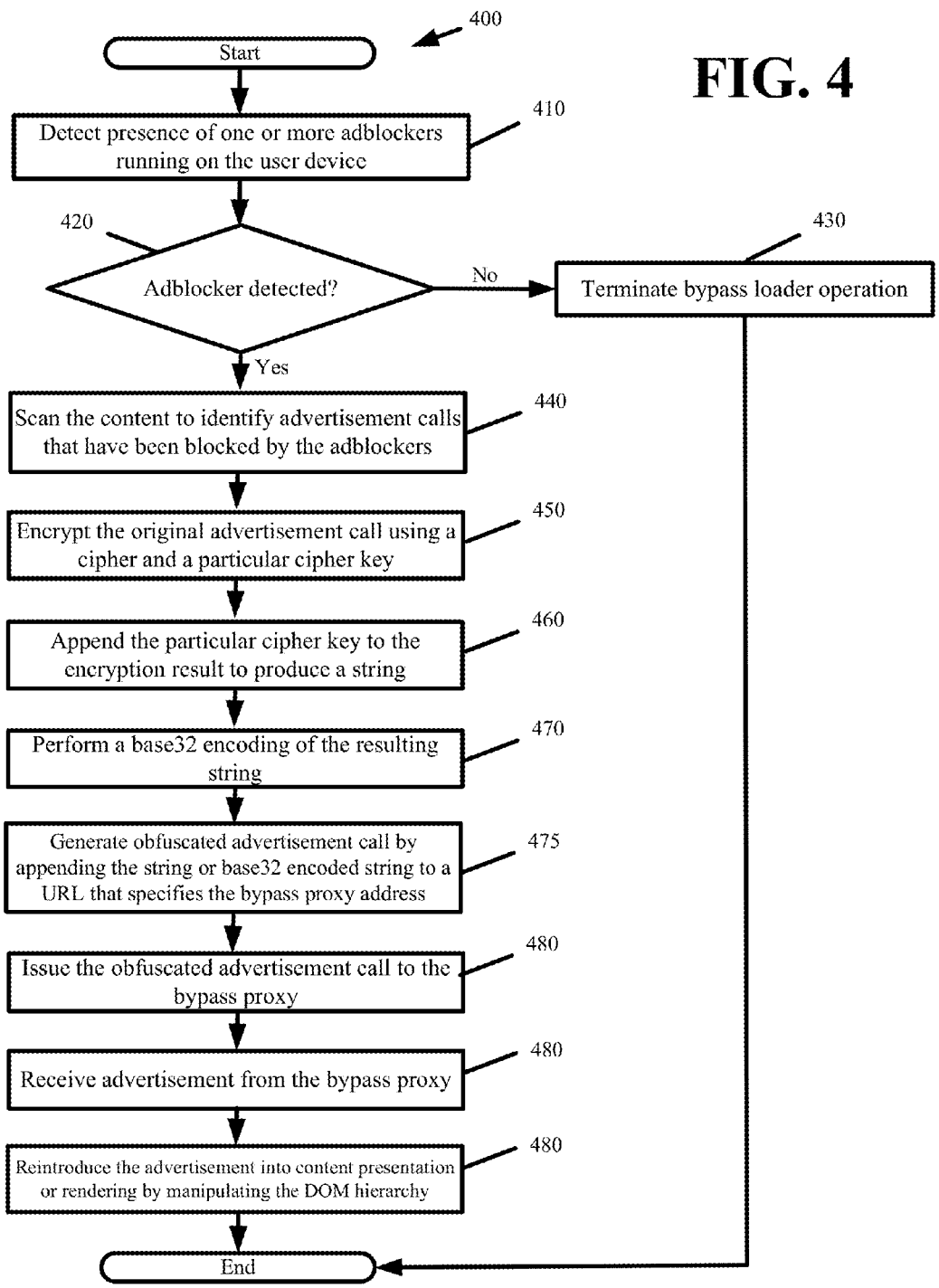
FIG. 4 presents a process performed by the bypass loader for counteracting the advertisement intercepting and blocking of adblockers in accordance with some embodiments.

FIG. 4 presents a process 400 performed by the bypass loader for counteracting the advertisement intercepting and blocking of adblockers in accordance with some embodiments. The process begins when the bypass loader is invoked as a result of firing the load event.

The process detects (at 410) presence of one or more adblockers on the user device on which the bypass loader executes. As noted above, this can be accomplished based on the presence or absence of a specific advertisement tag that is required to return before the load event can be fired. If an adblocker was running on the user device, the adblocker would remove or block that specific advertisement tag and the absence of which would indicate to the bypass loader that an adblocker is in fact running. In some embodiments, the bypass loader detects the presence of an adblocker by identifying that dimensions of an advertisement have been set to zero such that they are not visible.

If no adblocker is detected (at 420), the process terminates (at 430) operation of the bypass loader and the content is rendered on the user device without any changes. However, if one or more adblockers are detected (at 420), the process scans (at 440) the content to identify advertisement calls that have been or could be blocked by the adblockers.

For each identified original advertisement call that is or may be blocked by an adblocker, the process produces an obfuscated advertisement call. The process produces the obfuscated advertisement call by encrypting (at 450) the original advertisement call using a cipher and a particular cipher key. The process appends (at 460) the particular cipher key to the encryption result yielding a string of potentially arbitrary length. The particular cipher key may be a fixed size (e.g., five characters) such that the bypass proxy is able to later identify and extract the particular cipher key from the string. The process optionally performs (at 470) a base32 encoding of the resulting string to ensure the string is formatted as a proper URL query string argument or pathname. The process then appends (at 475) the string or base32 encoded string containing the encrypted original advertisement call and particular cipher key to a URL that specifies the bypass proxy address (e.g., IP address or domain name). The bypass proxy address appended with the string containing the original advertisement call and the particular cipher key yield the obfuscated advertisement call. The process issues (at 480) the obfuscated advertisement call to the bypass proxy.

As noted above, certain adblockers, when rendering content of a particular content publisher, may block any calls that are issued to any third party domain that deviates from the domain of that particular content publisher. In such cases, the bypass proxy address of the obfuscated advertisement call can specify an address to a load balancing server or other server of the particular content publisher that operates in concert with the adblocking bypass system of some embodiments. Thus, the bypass loader sends the obfuscated advertisement call to a load balancer or other machine of the content publisher to avoid the adblocker from blocking the call. The load balancer then identifies the obfuscated advertisement call and forwards it to the bypass proxy. Alternatively, the load balancer or other machine of the content publisher can directly incorporate and perform the bypass proxy functionality such that the bypass proxy address can address that load balancer or other content publisher machine without any further redirection.

The bypass proxy reverses the bypass loader operations to extract the original advertisement call from the obfuscated advertisement call, request the advertisement from the appropriate advertisement server using the original advertisement call, and return the advertisement to the bypass loader. Accordingly, the process receives (at 490) the advertisement from the bypass proxy and reintroduces (at 495) the advertisement as part of the content presentation or rendering. As noted above, the process can reintroduce the advertisement by manipulating the DOM hierarchy. The process then ends.

Figure 5:
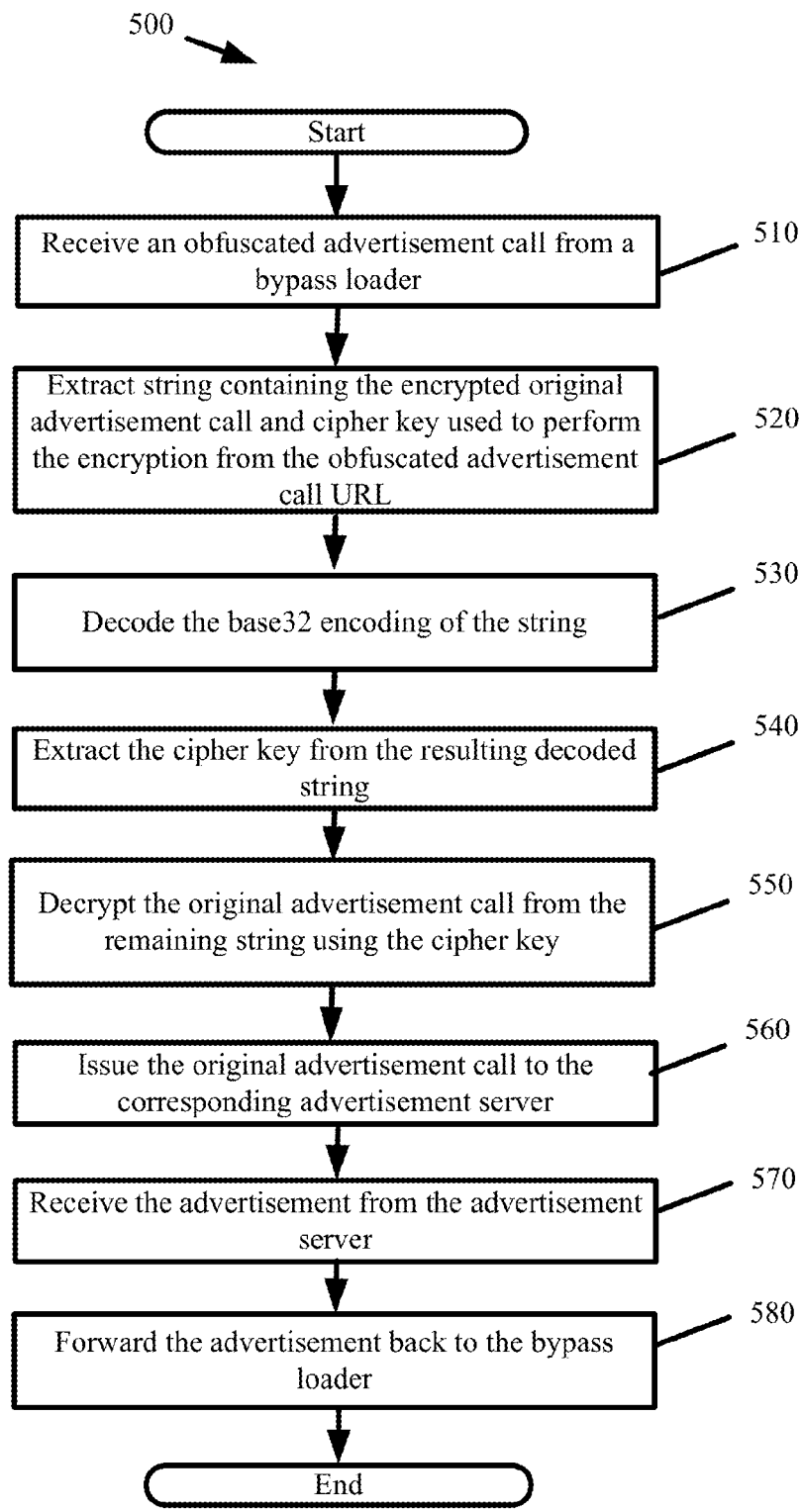
FIG. 5 presents a process performed by the bypass proxy for retrieving an advertisement on behalf of an instance of the bypass loader in accordance with some embodiments.

FIG. 5 presents a process 500 performed by the bypass proxy for retrieving an advertisement on behalf of an instance of the bypass loader in accordance with some embodiments. The process 500 commences when the bypass proxy receives (at 510) an obfuscated advertisement call from a bypass loader. The process extracts (at 520) the string containing the encrypted original advertisement call and cipher key used to perform the encryption from the obfuscated advertisement call URL. The process decodes (at 530) the base32 encoding of the string if one was applied. The process extracts (at 540) the cipher key from the resulting decoded string. As noted above, the cipher key will be some fixed number of symbols or alphanumeric characters at the end of the string. The process decrypts (at 550) the original advertisement call from the remaining string using the cipher key. The process then issues (at 560) the original advertisement call to the corresponding advertisement server on behalf of the bypass loader. The process receives (at 570) the advertisement in response. Lastly, the process forwards (at 580) the advertisement back to the bypass loader that initially passed the obfuscated advertisement call to the bypass proxy.

In some embodiments, the bypass proxy preserves the ability of the advertisement server to track the user devices that receive the advertisements served by the advertisement server. To do so, step 560 above can be modified such that when the bypass proxy issues the original advertisement call to the advertisement server, the bypass proxy forwards the user device information to the advertisement server. Specifically, the bypass proxy reads the request header encapsulating the original advertisement call to extract identifying information about the user device including the user device IP address. The identifying information is then forwarded in the advertisement call that the bypass proxy submits to the advertisement server on behalf of the user device. The advertisement server can then track the true recipient for the advertisement. Similarly, when forwarding the advertisement back to the bypass loader at step 580, the bypass proxy can submit the advertisement with the header provided by the advertisement server which may include a cookie or other tracking information.

Figure 6:
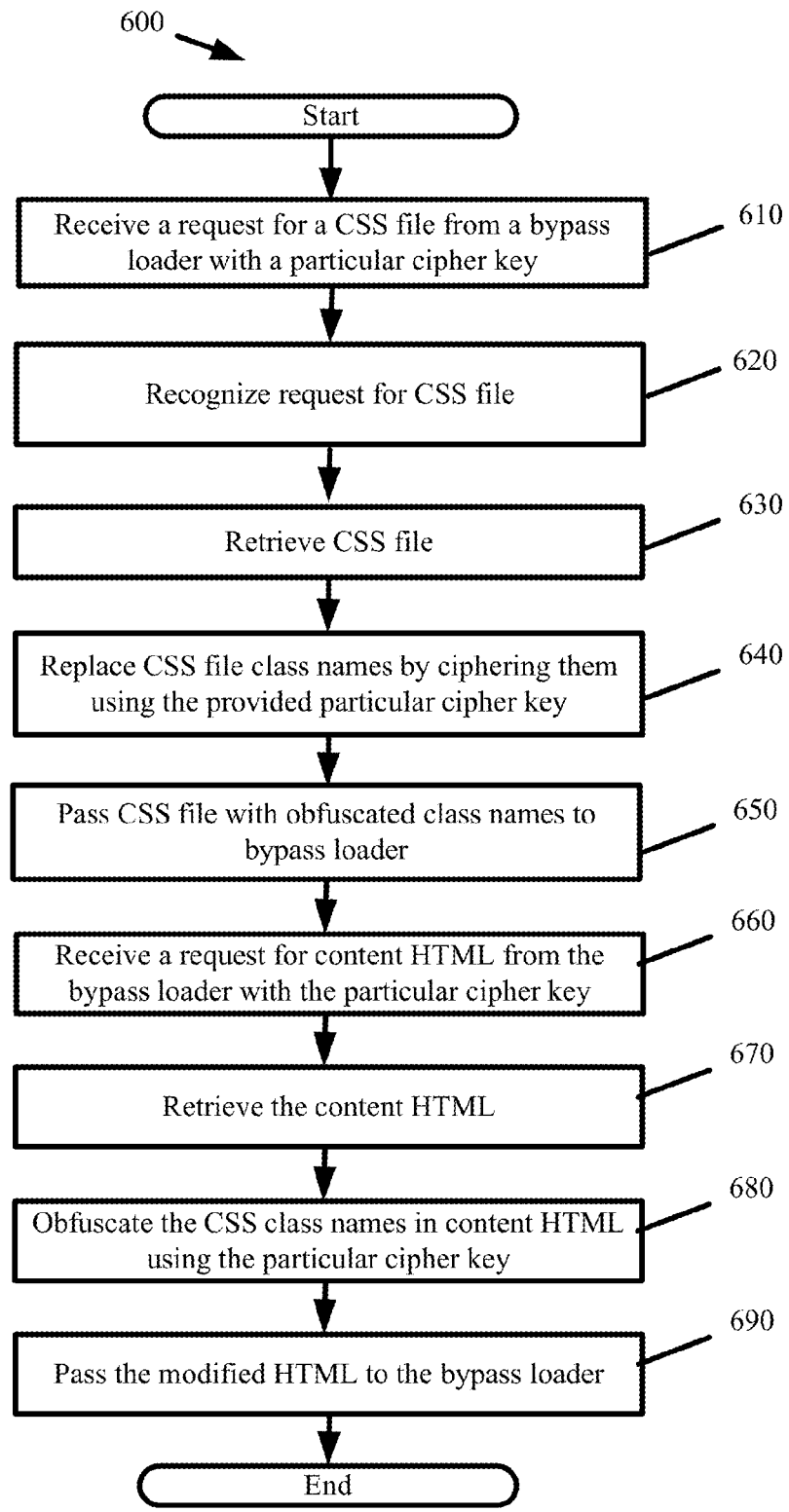
FIG. 6 presents a CSS translation process for circumventing CSS blocking by adblockers in accordance with some embodiments.

Some adblockers perform a more aggressive secondary or alternative routine to prevent the display of advertisements. They do so by blocking elements matching certain CSS selectors. The adblocking bypass system of some embodiments circumvents this adblocking operation by using the bypass loader to insert random zero space elements (i.e., elements that are invisible on the page) to change the DOM ordering. In so doing, the bypass loader is able to vary or otherwise modify the sought after selectors. An alternative method to circumvent CSS selector blocking is described with reference to the CSS translation process 600 of FIG. 6.

The process commences with the bypass proxy receiving (at 610) a request for a CSS file from a bypass loader with a particular cipher key specified on the URL request. The bypass proxy recognizes (at 620) the request for the CSS file, retrieves (at 630) the CSS file, and searches through it to replace (at 640) all class names with a ciphered version using the provided particular cipher key before passing (at 650) the CSS file with the obfuscated class names to the bypass loader. The process then receives (at 660) a request for the content HTML from the bypass loader again with the same cipher key. The process retrieves (at 670) the content HTML and performs the same ciphering to obfuscate (at 680) the CSS class names therein to match the changed names of the CSS file. The process passes (at 690) the modified HTML to the bypass loader which can then render the content in a manner that prevents the CSS and any included advertisement therein from being blocked.

Some adblockers attempt to circumvent the above systems and methodologies by indiscriminately blocking any calls from a first party page or site that are directed to any third party reachable at a different domain, hostname, address, or other identifier than the first party. In other words, a third party is any domain, hostname, address, or other identifier that differs from the domain, hostname, address, or other identifier used to retrieve the first party page or site from which the calls to the third parties are issued. For example, when an end user machine issues a request for the domain "example.com" and receives a page in response, the adblocker running on the end user machine blocks any requests issuing from this base page that are not directed to the "example.com" domain.

To remain ahead of this game of cat and mouse, some embodiments provide systems and methods that replace calls or links to third party content with encodings of the actual third party content. In some embodiments, the systems and methods insert third party encoded content into a base page even when there is no call for that third party content or there is a call to different third party content in the base page. In some such embodiments, the third party content is converted from a first original encoding to a different second encoding, wherein the first encoding can be binary and the second encoding can be text. The second encoding is embedded as a data attribute on the webpage rendering the third party content invisible to an adblocker.

In particular, the embodiments encode advertisements and other third party content directly in the HTML of the first party page or site, thereby making the third party advertisements or content indistinguishable from the first party content in the first party page or site. The third party content therefore becomes embedded as part of the first party page without the end user machine issuing any calls to third party domains, hostnames, addresses, or other third party identifiers that differ from the first party domains, hostnames, addresses, or other first party identifiers. In some embodiments, the third party content (e.g., images, videos, scripts, applications, or other content) might be defined with HTML code that has been base64 encoded and attached to an HTML element on the first page as a data attribute, such as: data-adblock-advertisement= "45490234952384239084032985092385089970dfgkljdlsgkj349850"

Figure 7:
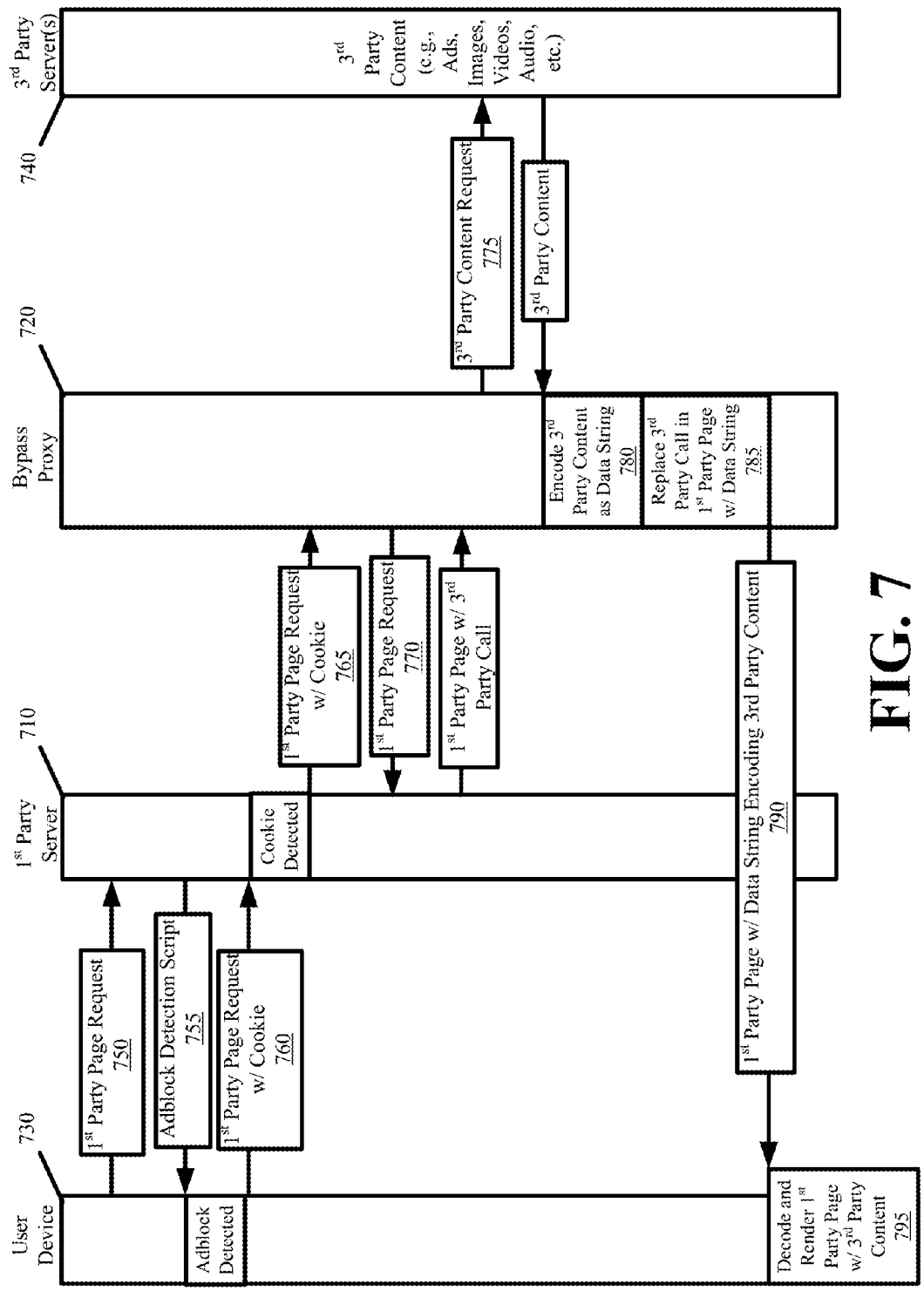
FIG. 7 presents an exemplary message exchange diagram for replacing third party calls in first party content with encodings of the actual third party content in accordance with some embodiments.

FIG. 7 presents an exemplary message exchange diagram occurring over a digital network for replacing third party calls in first party content with encodings of the actual third party content in accordance with some embodiments. The figure illustrates interactions between a first party server 710, the bypass proxy 720 of some embodiments, the end user machine 730, and one or more third party content servers 740.

The first party server 710 is the server from which end users request and receive the HTML for a first party page or site that is generated by a particular content publisher. The first party server 710 may be operated by the particular content publisher, a CDN, or other service provider that distributes the content publisher content on behalf of the content publisher.

In any case, any request for the first party page or any request directed to the first party (i.e., content publisher) domain, hostname, address, or other identifier routes from the end user machine 730 to the first party server 710. Thus, the message exchange commences with the end user machine 730 sending (at 750) a request for the HTML of the first party page over a digital network (i.e., the Internet) to the first party server 710.

In response to an initial user request for the first party page, the first party server 710 responds (at 755) to the initial request by returning an adblock detection and notification script. The adblock detection and notification script may be an entirely different HTML page than the HTML page for the first party page. Alternatively, the adblock detection and notification script may be included as part of the HTML of the first party page. In some such embodiments, the adblock detection and notification script can be a few lines of javascript that the content publisher inserts into the first party page.

Similar to the above embodiments, when the adblock detection and notification script executes on the end user machine 730, the script tracks whether third party calls, links, or scripts have fired on the load event. If not, the script determines that the end user machine 730 is running an adblocker.

Although not shown in the figure, if the adblock detection and notification script does not detect an adblocker running on the end user machine 730, then the first party page is correctly rendered and displayed on the end user machine 730 provided that the HTML for the first party page is included in the HTML page containing the adblock detection and script. Otherwise, the adblock detection and notification script can issue another request from the end user machine 730 to the first party server 710 for the first party page. In this case, the first party server 710 responds to this subsequent request with the first party page that includes the calls or links to the third party advertisements or third party content.

If the adblock detection and notification script detects an adblocker running on the end user machine 730, the adblock detection and notification script generates an adblock identifier to indicate the detection of the adblocker running on the end user machine 730. In some embodiments, the adblock identifier is a cookie that is generated on the end user machine 730. The adblock detection and notification script executes an asynchronous JavaScript and XML (AJAX) call to generate the cookie. The cookie includes a parameter to indicate the detection of the adblocker running on the end user machine 730. In addition to or instead of the cookie generation, some embodiments set a request header field or flag as the adblock identifier indicating presence of an adblocker on the end user machine 730. Other methods or identifiers could also be used to track the detection of an adblocker on the end user machine 730 including, for example, using HTML5 local storage, device signatures (i.e., canvas or browser fingerprinting), or query strings that are appended to future requests.

In some embodiments, the script issues a request for the first party page if the HTML for the first party page was not sent with the adblock detection and notification script. In some embodiments, the script causes the first party page to reload if the HTML for the first party page was provided with the adblock detection and notification script. In either of these embodiments, the end user machine issues (at 760) a request to the first party server 710 for the first party page with the cookie, request header field or flag, or other adblock identifier indicating presence of the adblocker on the end user machine 730.

In some embodiments, the first party page is not requested again or reloaded if the adblocker identifier was not provided with the end user machine's 730 original request to the first party server 710. In some such embodiments, the adblock identifier is created on the end user machine 730 for the first visit to the first party page, but the third party content may be blocked. However, subsequent requests for the first party page from the end user machine 730 will pass with the adblock identifier, thereby triggering the remaining steps of FIG. 7.

The first party server 710 detects the cookie, header, or other adblock identifier indicating adblocker presence on the end user machine 730, and reroutes (at 765) the request to the bypass proxy 720. In some embodiments, the first party server 710 represents a combination of a load balancer or other request distributor and one or more content distribution servers, wherein the load balancer or other request distributor distributes user requests across the one or more content distribution servers, and wherein the distribution server provides the first party content in response to the requests. In some such embodiments, the load balancer is configured with server-side load balancing rules that perform the rerouting upon cookie, header, or other adblock identifier detection. It is important to note that the rerouting occurs without the end user machine's 730 knowledge.

The bypass proxy 720 receives the end user machine 730 issued request with the adblock identifier. The bypass proxy 720 retrieves (at 770) the first party page from the first party server 710. The bypass proxy 720 issues (at 775) any third party calls that are specified in the HTML of the first party page to the one or more third party content servers 740 and retrieves the corresponding third party advertisements or other third party content from the third party content servers 740. As noted above, the bypass proxy 720 can also retrieve third party content from other third parties than those identified within the third party calls on the first party page. For instance, the first party page may include a first third party call for a first advertisement from a first advertisement provider. Instead of invoking this first third party call, the bypass proxy 720 issues a call to retrieve a second advertisement from a different second advertisement provider. The third party content replacement may be performed when the bypass proxy 720 is configured to present different advertisements or third party content to end user machines that run an adblocker than end user machines that do not run an adblocker. In some embodiments, the bypass proxy 720 dynamically adds third party content to the first party page even when there are no calls in the first party page to that third party content. In some such embodiments, the bypass proxy 720 inserts advertisements or other third party content into the first party page on behalf of the content publisher without the content publisher having to define calls for the third party content in the first party page. In other words, the bypass proxy 720 automatically adds or embeds third party content at different places within the first party page even when the first party page is not defined with any such third party content.

At this stage, the bypass proxy 720 has the original first party page. The bypass proxy 720 also has various third party content from one or more third parties for inclusion as part of the first party page, wherein calls for retrieving that third party content would have been blocked by the adblocker if issued from that end user machine 730.

The bypass proxy 720 encodes (at 780) the retrieved third party content. In some embodiments, the bypass proxy 720 performs a base64 encoding of the third party content. The base64 encoding performs a binary-to-text encoding such that images, audio, video, text, scripts, services, applications, or any other binary formatted data can be converted into a data string. For example, the encoding can convert a binary image encoding to text which is a data string formed from a sequence of alphanumeric characters. Each third party content encoding produces a different and unique data string. It should be noted that the bypass proxy 720 can perform any number of different encodings in addition to or instead of a base64 encoding to convert the third party content binary into an indecipherable data string.

The bypass proxy 720 replaces (at 785) each call within the first party page HTML to particular third party content with the encoded data string for the particular third party content. More specifically, the bypass proxy 720 directly embeds the encoded data string into the first party page HTML in the place of the call or link to third party content. As some examples, calls to third party content made using the HTML href or src attributes can be replaced with different encoded data strings. In the case where the bypass proxy 720 replaces a call to a first third party with content from a second third party, the bypass proxy 720 simply replaces the first third party call with the encoded data string for the second third party content. In the case where the bypass proxy 720 adds third party content to the first party page, the bypass proxy 720 can selectively insert the encoded data string for the third party content at different parts within the first party page. The placement may be irrelevant when the encoded data string encodes a banner or pop-up advertisement.

In some embodiments, the bypass proxy 720 may delimit or otherwise demarcate the encoded content to differentiate it from other HTML or first party page content. The bypass proxy 720 may prepend a dynamic identifier to the encoded third party content data string. The prepended identifier is one that the adblock detection and notification script running on the end user machine 730 can detect, and therefore properly decode to regenerate the third party content from the encoded data string. By performing steps 780 and 785, the bypass proxy 720 removes the third party calls while embedding the third party content directly into first party page or site in a manner that makes the embedded third party content indistinguishable from the first party content, thereby preventing any adblocker from blocking the content.

Figure 8:
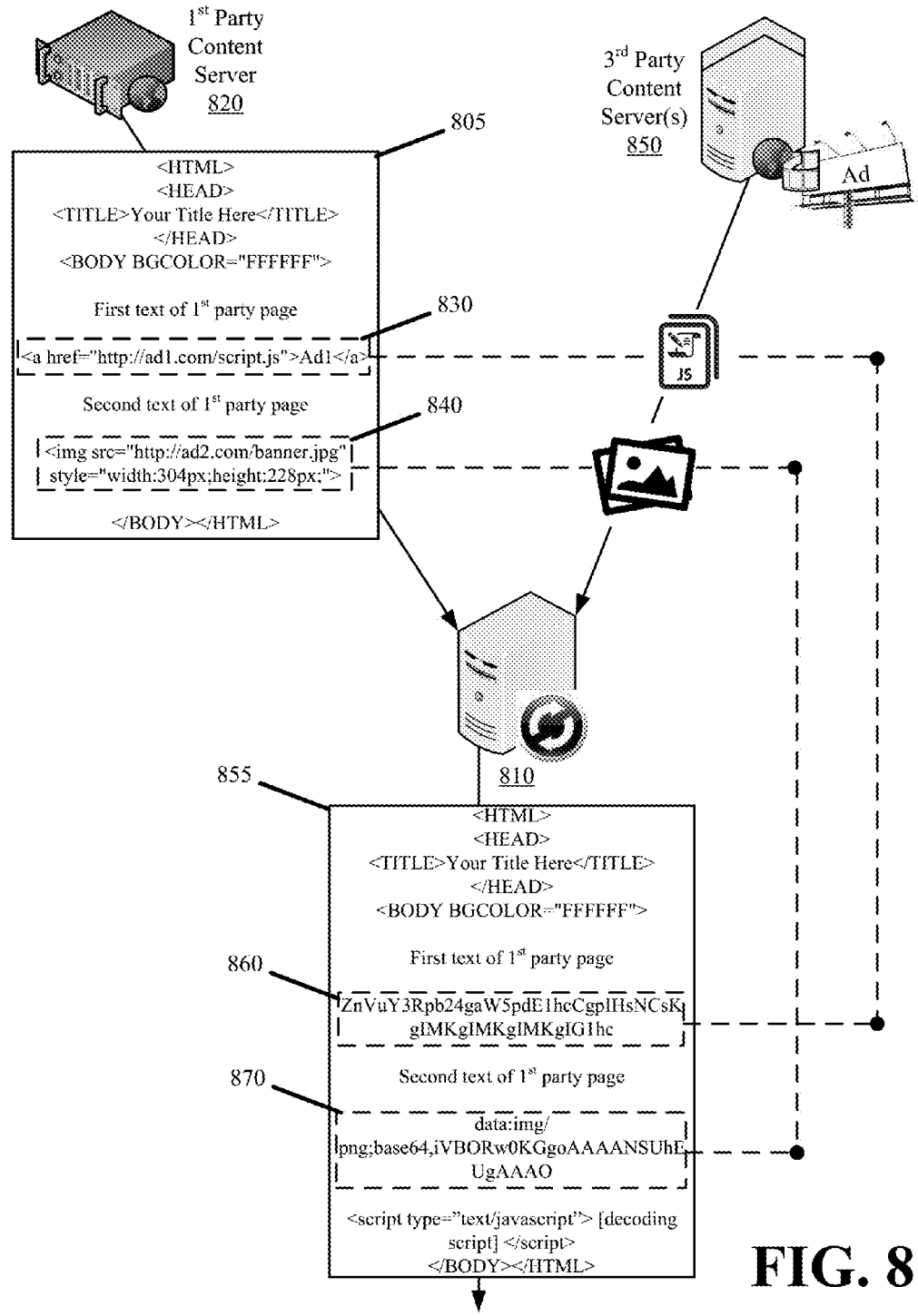
FIG. 8 conceptually illustrates the bypass proxy of some embodiments modifying an original first party page by directly embedding encoded third party content in place of the third party calls that would ordinarily execute on the end user machine.

FIG. 8 conceptually illustrates the bypass proxy 810 of some embodiments modifying an original first party page by directly embedding encoded third party content in place of the third party calls that would ordinarily execute on the end user machine. The figure illustrates HTML of the original first party page 805 that the bypass proxy 810 obtains from the first party server 820. The first party page HTML 805 includes a first call 830 to a third party provided script and a second call 840 to a third party graphical advertisement that the content publisher includes as part of the first party page or site.

The figure illustrates the bypass proxy 810 retrieving the third party content from third party servers 850. The bypass proxy 810 then produces the modified first party page 855 in which the first and second calls 830 and 840 have been replaced with the data strings 860 and 870 that result from encoding the script and the graphical advertisement. The encoded data strings 860 and 870 appear as HTML code, text, or content that is part of the first party page or site. Encoded data string 870 also includes a delimiter that identifies image content within the encoded data string 870. Adblockers will be unable to differentiate the encoded data strings 860 and 870 from other original first party content and will not block the encoded data strings 860 and 870 because the encoded data strings 860 and 870 appear to be nothing more than HTML from the original first party page 805.

The bypass proxy 720 also inserts a decoding script as part of the modified first party page 855, wherein the modified first party page 855 includes the encoded third party content instead of the calls to the third party content. When run on the end user machine 730 as part of rendering the modified first page, the decoding script instructs the end user machine 730 on how to detect and decode the embedded third party content. In some embodiments, the decoding script searches for the prepended delimiters, obtains the encoded data strings associated with each delimiter, produces the original third party content from decoding the encoded data strings, and embeds the third party content as part of the final rendering of the first party page.

With reference back to FIG. 7, the bypass proxy 720 sends (at 790) the modified first party page with the encoded third party content back to the requesting end user machine 730. In some embodiments, the bypass proxy 720 sends the modified first party page over a digital network, such as the Internet, to the end user machine 730. In some other embodiments, the bypass proxy 720 sends the modified first party page to the first party server 710. The first party server 710 then forwards the modified first page to the end user machine 730.

The end user machine 730 receives the modified first party page. The end user machine 730 renders (at 795) the page. As it reads the HTML within the page, the end user machine 730 will come across the decoding script. Execution of the decoding script reverts the data string encoding the third party content back into its original form whether as an advertisement, image, video, audio, script, etc. Since the adblocker cannot differentiate this content from other first party page or site content, the third party content is included in the presentation of the first party page despite all checking and blocking performed by the adblocker. Therefore, any third party content the bypass proxy 720 encodes and inserts into the modified first party page is displayed on the user machine 730. The content publisher is therefore able to monetize on its first party content through the inclusion and presentation of third party advertisements.

In some embodiments, the bypass proxy 720 is integrated with the first party server 710. The third party content encoding and first party page modification can therefore occur locally on the first party server 710. In some such embodiments, the bypass proxy 720 functionality can run directly only the first party server 710 hardware, wherein FIG. 9 below presents an exemplary set of hardware for implementing the first party server 710. The bypass proxy 720 can also be a machine that is collocated with the first party server 710 and that run in parallel with the first party server 710.

Some embodiments skip the steps for inserting the adblock detection script and performing the adblock detection on the user machine. In some such embodiments, the first party server 710 forwards all landing page or base page requests for a first party page to the bypass proxy 720. The bypass proxy 720 retrieves the linked third party content, encodes the third party content, and embeds the third party content back into the HTML of the first party page in place of the third party content calls along with the decoding script. The modified page is then returned to the requesting user in all cases irrespective of whether the user machine is running an adblocker or not.

Similarly, some embodiments modify an original instance of a first party page using the bypass proxy 720. The modified first party page embeds encodings of third party content directly in the first party page either in place of the third party content calls or in addition to the original first party content. The modified first party page is then passed in response to any or all requests for the first party content regardless of whether an adblocker is detected on the requesting user machine. In other words, rather than dynamically generate the modified first party page in response to different user requests, some embodiments generate the modified first party page with the embedded third party content and decoding script prior to receiving one or more user requests. Thereafter, the same copy of the modified first party page is served in response to each of the one or more requests.

Many of the above-described processes and components are implemented as software processes that are specified as a set of instructions recorded on non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense and may include any electronic device with a processor that executes instructions stored on computer-readable media or that are obtained remotely over a network connection. Examples of computer-readable media include, but are not limited to, CD-ROMs, flash drives, RAM chips, hard drives, EPROMs, etc. Further, wherever a server or device is identified as a component of the embodied invention, it is understood that the server may be a single physical machine, or a cluster of multiple physical machines performing related functions, or virtualized servers co-resident on a single physical machine, or various combinations of the above.

FIG. 9 illustrates a computer system or server with which some embodiments of the bypass system are implemented. Such a computer system includes various types of computer-readable mediums and interfaces for various other types of computer-readable mediums that implement the processes described herein. Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike the storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include, but are not limited to, alphanumeric keypads (including physical keyboards and touchscreen keyboards) and pointing devices. The input devices 930 also include audio input devices (e.g., microphones, MIDI musical instruments, etc.). The output devices 935 display images generated by the computer system. The output devices include, but are not limited to, printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A computer-implemented method for ensuring presentation of content from external destinations on a user device despite execution of an external destination blocker running on the user device, the computer-implemented method comprising:

retrieving at a proxy, a HyperText Markup Language (HTML) page of a first party site from the first party site in response to a user device request for said HTML page that is rerouted from the first party site to the proxy, said HTML page comprising at least one call to a different third party site;

issuing the call from said proxy to the third party site;

receiving third party content in response to said issuing;

encoding the third party content as an encoded data string;

generating a modified HTML page by removing the call to the third party site and inserting the encoded data string encoding the third party content in place of the call; and sending the modified HTML page over a digital network in response to said user device request.

2. The method of claim 1, wherein the third party site is reachable with a different domain name, hostname, address, or other identifier than the first party site.

3. The method of claim 1, wherein the third party content comprises at least one of an image, text, video, audio, advertisement, or script, and wherein encoding the third party content comprises performing a binary-to-text encoding of the third party content.

4. The method of claim 1 further comprising inserting a decoding script in the modified HTML page, wherein the decoding script comprises a set of computer-executable instructions converting the data string back to the third party content.

5. The method of claim 4 further comprising rendering the modified HTML page on the user device, wherein rendering the modified HTML page comprises decoding the encoded data string with the decoding script and presenting the third party content as part of the HTML page on the user device running said external destination blocker as a result of said decoding.

6. The method of claim 1 further comprising detecting execution of the blocker on the user device prior to said retrieving, issuing, receiving, encoding, generating, and sending.

7. The method of claim 6, wherein detecting execution of the blocker comprises identifying at least one call that does not fire on the user device during rendering of an HTML page.

8. The method of claim 6 further comprising generating a cookie on the user device in response to said detecting.

9. The method of claim 1, wherein said user device request comprises a cookie indicating execution of the blocker on the user device.

10. The method of claim 1 further comprising receiving a first user request for the HTML page, the first user request comprising an adblocker identifier signaling execution of an adblocker on the user device.

11. The method of claim 10 further comprising receiving a second user request for the HTML page without the adblocker identifier, and sending the HTML page unmodified with the call to the third party site in response to said second user request.

12. The method of claim 1, wherein said generating comprises embedding a decoding script into the modified HTML page, the decoding script comprising instructions decoding the encoded data string back to an original encoding of the third party content.

13. The method of claim 1, wherein said third party content is a binary encoding and said encoded data string is a text encoding, and wherein inserting the encoded data string comprises embedding the text encoding as an HTML data attribute into the modified HTML page in place of the call.

14. The method of claim 1, wherein said receiving the third party content comprises retrieving an original first encoding of a third party advertisement, wherein said encoding comprises converting the original first encoding of the third party advertisement into the encoded data string comprising first text, and wherein inserting the encoded data string comprises embedding the first text into the modified HTML page in place of said call to the third party site.

15. The method of claim 14, wherein said receiving the third party content further comprises retrieving a third party image from a different third party site than the third party advertisement, wherein said encoding further comprises converting the third party image into second text that is different than the first text, and wherein inserting the encoded data string further comprises embedding the second text into the modified HTML page.

16. The method of claim 15, wherein said receiving the third party content further comprises retrieving a third party script from a different third party site than the third party image, wherein said encoding further comprises converting the third party script into third text that is different than the second text, and wherein inserting the encoded data string further comprises embedding the third text into the modified HTML page.

17. The method of claim 1, wherein the call is an HTML href attribute within the HTML page, and wherein inserting the encoded data string in place of the call comprises replacing the HTML href attribute with text of the encoded data string.

18. The method of claim 1, wherein the call is an HTML script attribute within the HTML page, and wherein inserting the encoded data string in place of the call comprises replacing the HTML script attribute with text of the encoded data string.

19. An advertisement blocking bypass system, the system comprising:
 a first party content server comprising a processor, a network interface, and a memory storing a first party webpage comprising first party content and at least one call directed to a different address of a third party hosting third party content included as part of the first party webpage, wherein the first party content server is configured to send the first party webpage in response to a request from a user machine not running a blocker that blocks the third party content from being loaded as part of the first party webpage, and wherein the first party content server is further configured to forward a request for the first party webpage from a user machine running said blocker; and
 a bypass proxy server comprising a processor, a network interface, and a memory storing a copy of the first party webpage, wherein the bypass proxy server receives a request forwarded by the first party content server, wherein the bypass proxy server is configured to:
  (i) issue the at least one call directed to the address of the third party;
  (ii) retrieve the third party content from the third party in response to issuing the at least one call;
  (iii) convert a binary encoding of the third party content into a text encoding;
  (iv) replace the call in the first party webpage with the text encoding;
  (v) send the first party webpage with the text encoding in place of the call to the user machine running said blocker.

20. The system of claim 19, wherein the bypass proxy server is further configured to insert a text-to-binary decoder in the first party webpage.

* * * * *